(12) United States Patent
Walther

(10) Patent No.: US 9,405,742 B2
(45) Date of Patent: Aug. 2, 2016

(54) METHOD FOR PHONETIZING A DATA LIST AND VOICE-CONTROLLED USER INTERFACE

(71) Applicant: Jens Walther, Fronausen (DE)

(72) Inventor: Jens Walther, Fronausen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/378,879

(22) PCT Filed: Feb. 11, 2013

(86) PCT No.: PCT/EP2013/052654
§ 371 (c)(1),
(2) Date: Aug. 14, 2014

(87) PCT Pub. No.: WO2013/120796
PCT Pub. Date: Aug. 22, 2013

(65) Prior Publication Data
US 2015/0012261 A1    Jan. 8, 2015

(30) Foreign Application Priority Data
Feb. 16, 2012   (DE) .......................... 10 2012 202 407

(51) Int. Cl.
*G10L 15/00*  (2013.01)
*G10L 19/06*  (2013.01)
(Continued)

(52) U.S. Cl.
CPC ............ *G06F 17/2705* (2013.01); *G06F 3/167* (2013.01); *G06F 17/3061* (2013.01); *G10L 13/08* (2013.01); *G10L 15/187* (2013.01); *G10L 15/285* (2013.01); *G10L 2015/228* (2013.01)

(58) Field of Classification Search
CPC ....... G10L 15/08; G10L 15/187; G10L 15/22; G10L 15/265; G10L 15/063; G10L 15/02; G10L 13/07; G10L 13/08; G10L 21/04; G10L 19/12; H05K 999/99; G06F 17/289; G06F 17/2735
USPC ......... 704/252, 209, 260, 254, 275, 211, 251, 704/236, 2, 258, 235, 243, 10, 220, 266, 704/231, 257
See application file for complete search history.

(56) References Cited

U.S. PATENT DOCUMENTS 5,384,893 A * 1/1995 Hutchins ................. G10L 13/10
704/258
6,108,627 A * 8/2000 Sabourin ............... G10L 15/187
704/10

(Continued)

FOREIGN PATENT DOCUMENTS

| CA | 2256781 A1 | 3/2000 |
| EP | 1739546 A2 | 1/2007 |
| WO | WO 03/003152 A2 | 1/2003 |

*Primary Examiner* — Paras D Shah
*Assistant Examiner* — Anne Thomas-Homescu
(74) *Attorney, Agent, or Firm* — Cozen O'Connor

(57) ABSTRACT

A method for phonetizing a data list having text-containing list entries, each list entry in the data list being subdivided into at least two data fields for provision to a voice-controlled user interface, includes: converting a list entry from a text representation into phonetics; storing the phonetics as phonemes in a phonetized data list; inserting a separating character into the text of a list entry between the respective data fields of the list entry, concomitantly converting the inserted separating character into phonetics and concomitantly storing the converted separating character as a phoneme symbol; and storing the phonemes in a phonetic database, the phonetized data list being produced from the phonemes stored in the phonetic database.

4 Claims, 3 Drawing Sheets

(51) Int. Cl.

| | |
|---|---|
| *G10L 21/00* | (2013.01) |
| *G10L 15/26* | (2006.01) |
| *G10L 15/06* | (2013.01) |
| *G10L 19/00* | (2013.01) |
| *G10L 13/00* | (2006.01) |
| *G10L 13/06* | (2013.01) |
| *G10L 15/18* | (2013.01) |
| *G10L 25/00* | (2013.01) |
| *G06F 17/21* | (2006.01) |
| *G06F 17/27* | (2006.01) |
| *G10L 13/08* | (2013.01) |
| *G10L 15/187* | (2013.01) |
| *G06F 3/16* | (2006.01) |
| *G06F 17/30* | (2006.01) |
| *G06F 17/20* | (2006.01) |
| *G06F 17/28* | (2006.01) |
| *G10L 15/28* | (2013.01) |
| *G10L 15/22* | (2006.01) |

(56) References Cited

U.S. PATENT DOCUMENTS

| | | | | |
|---|---|---|---|---|
| 6,208,968 | B1* | 3/2001 | Vitale | G10L 13/08 704/260 |
| 6,230,131 | B1* | 5/2001 | Kuhn | G10L 13/08 704/266 |
| 6,233,553 | B1* | 5/2001 | Contolini | G10L 15/065 704/220 |
| 6,236,965 | B1* | 5/2001 | Kim | G10L 15/06 704/232 |
| 6,347,295 | B1* | 2/2002 | Vitale | G10L 13/08 704/209 |
| 6,347,298 | B2* | 2/2002 | Vitale | 704/10 |
| 6,363,342 | B2* | 3/2002 | Shaw | 704/220 |
| 6,393,444 | B1* | 5/2002 | Lawrence | G06F 17/273 715/257 |
| 6,542,867 | B1* | 4/2003 | Sun | G10L 13/10 704/260 |
| 6,684,185 | B1* | 1/2004 | Junqua | G10L 15/26 704/243 |
| 6,757,652 | B1* | 6/2004 | Lund | G10L 15/32 704/252 |
| 7,188,138 | B1* | 3/2007 | Schneider | G06Q 30/02 709/203 |
| 2002/0013707 | A1* | 1/2002 | Shaw | G10L 15/063 704/257 |
| 2002/0049591 | A1* | 4/2002 | Hain | G10L 13/08 704/243 |
| 2003/0009337 | A1* | 1/2003 | Rupsis | H04L 29/06027 704/260 |
| 2003/0049588 | A1* | 3/2003 | Lawrence | G06F 17/273 434/167 |
| 2003/0120482 | A1* | 6/2003 | Tian | H03M 7/30 704/209 |
| 2003/0149676 | A1* | 8/2003 | Kasabov | G06N 3/0436 706/2 |
| 2003/0187643 | A1* | 10/2003 | Van Thong | G10L 15/08 704/254 |
| 2004/0073423 | A1* | 4/2004 | Freedman | G10L 15/02 704/235 |
| 2004/0230430 | A1* | 11/2004 | Gupta | G09B 19/06 704/235 |
| 2004/0230431 | A1* | 11/2004 | Gupta | G09B 19/06 704/254 |
| 2005/0005266 | A1* | 1/2005 | Datig | G06F 17/279 717/136 |
| 2005/0197837 | A1* | 9/2005 | Suontausta | G10L 15/005 704/260 |
| 2006/0031069 | A1* | 2/2006 | Huang | G10L 13/08 704/243 |
| 2006/0195319 | A1* | 8/2006 | Prous Blancafort | G10L 15/18 704/235 |
| 2006/0206328 | A1* | 9/2006 | Lukas | G11B 19/02 704/252 |
| 2006/0215821 | A1* | 9/2006 | Rokusek | G10L 15/22 379/88.01 |
| 2006/0265220 | A1* | 11/2006 | Massimino | G10L 13/08 704/235 |
| 2007/0061720 | A1* | 3/2007 | Kriger | G06F 17/214 715/700 |
| 2007/0150279 | A1* | 6/2007 | Gandhi | G10L 13/08 704/258 |
| 2007/0233485 | A1* | 10/2007 | Hitotsumatsu | G10L 15/08 704/251 |
| 2007/0233490 | A1* | 10/2007 | Yao | G10L 13/08 704/260 |
| 2009/0024183 | A1* | 1/2009 | Fitchmun | A61N 1/36032 607/56 |
| 2009/0037403 | A1* | 2/2009 | Joy | G06F 17/3087 |
| 2009/0228832 | A1* | 9/2009 | Cheng | G06F 3/0482 715/810 |
| 2009/0287486 | A1* | 11/2009 | Chang | G10L 15/063 704/235 |
| 2010/0005048 | A1* | 1/2010 | Bodapati | G06F 17/30303 706/47 |
| 2010/0017393 | A1* | 1/2010 | Broicher | G06F 17/30722 707/E17.014 |
| 2010/0174688 | A1* | 7/2010 | Anumakonda | G06F 17/30477 707/692 |
| 2010/0286984 | A1* | 11/2010 | Wandinger | G10L 15/04 704/251 |
| 2010/0305947 | A1* | 12/2010 | Schwarz | G10L 15/1815 704/252 |
| 2011/0131038 | A1* | 6/2011 | Oyaizu | G10L 15/06 704/10 |
| 2011/0202345 | A1* | 8/2011 | Meyer | G10L 13/033 704/260 |
| 2011/0282667 | A1* | 11/2011 | Hernandez-Abrego | G10L 15/19 704/254 |
| 2012/0215528 | A1* | 8/2012 | Nagatomo | G10L 15/22 704/211 |
| 2012/0265533 | A1* | 10/2012 | Honeycutt | G10L 13/00 704/260 |
| 2012/0330665 | A1* | 12/2012 | Berkun | G06F 19/3462 704/260 |
| 2013/0218587 | A1* | 8/2013 | Carter, Jr. | G06F 17/30424 705/2 |
| 2013/0253903 | A1* | 9/2013 | Stephen | G06F 17/27 704/2 |
| 2014/0006423 | A1* | 1/2014 | Melnychenko | G06F 17/3053 707/749 |
| 2014/0067400 | A1* | 3/2014 | Yamazaki | G10L 15/187 704/260 |
| 2014/0136210 | A1* | 5/2014 | Johnston | G10L 15/07 704/275 |
| 2014/0142925 | A1* | 5/2014 | Gish | G10L 15/063 704/10 |
| 2015/0088506 | A1* | 3/2015 | Obuchi | G10L 15/32 704/236 |

* cited by examiner

| Grapheme | | Phoneme | | | | Separating character index |
|---|---|---|---|---|---|---|
| First name | Surname | Phoneme 1 | Phoneme 2 | Phoneme 3 | Phoneme 4 | |
| Jens | Walther | #d&Z'Enz_wA+HSR+# | #d&Z'Enz_w'OItSR+# | #d&Z'Enz_w'A+HSR+# | #d&Z'Enz_w'OItSR+# | ,1,1,1 |

Fig. 3

METHOD FOR PHONETIZING A DATA LIST AND VOICE-CONTROLLED USER INTERFACE

CROSS-REFERENCE TO RELATED APPLICATIONS

This is a U.S. national stage of application No. PCT/EP2013/052654, filed on 11 Feb. 2013, which claims priority to the German Application No. 102012202407.7, filed 16 Feb. 2012, the content of both incorporated herein by reference.

BACKGROUND OF THE INVENTION

1. Field of the Invention

The invention relates to a method for phonetizing a data list having text-containing list entries, each list entry in the data list being, or having been, subdivided into at least two data fields, and to a voice-controlled user interface set up to carry out this method.

For voice-controlled user interfaces, it is necessary to phonetize data lists usually present in databases in order to supply the content of the data systems to a voice controller in which a user triggers particular actions by speaking the contents of the data list in the user interface.

A typical field of application, to which the invention also preferably relates, is the use of a voice-controlled user interface in a multimedia unit of a motor vehicle, which may have, in particular, as the voice-controlled user interface, a car telephone and/or a hands-free device of a motor vehicle, inter alia, with the result that the driver of the motor vehicle can use the voice-controlled user interface to set up and conduct a telephone call by stating a name. The voice controller can also naturally be used to control further functions of the multimedia unit. In principle, the invention can preferably be used in voice-controlled interfaces in which text-based data entries can be resorted.

In this case, the data list, which is constructed as a database, for example, may contain, in particular, names from telephone books or contact lists. In this application, the two data fields of the data list are, in particular, the first name and surname, for which a telephone number and/or further contact possibilities or information is/are stored.

Even if the application described above constitutes a preferred application of the invention, the latter is not restricted to precisely this function, however, but rather can also be generally used for voice-controlled user interfaces in which a data list in text form is intended to be phonetized for recognition by the voice controller, each list entry in the data list preferably having at least two data fields.

In a database, the list entry can be stored in a manner already divided into two data fields, for example first name and surname. In another application, the list entry can also be divided into two data fields by means of suitable software.

2. Related Art

As is already conventional in such voice-controlled user interfaces, list entries in a data list are intended to be provided to the voice-controlled user interface for voice recognition in order to be able to identify particular list entries from spoken commands from the user. In a method for phonetizing the data list, which is required for this purpose, a, or each, list entry from a text setting in the form of graphemes, that is to say a sequence of individual grapheme symbols or text characters which may correspond to the letter representation or to a standardized letter representation, for example, is converted into phonetics and stored as phonemes, that is to say a sequence of individual phoneme symbols. In accordance with a conventional definition, a phoneme symbol is a sound representation which, in a language, forms the smallest meaning-differentiating unit, that is to say performs the same distinctive function.

This phonetized data list, which is in the form of phonemes, that is to say in the form of a sequence of individual phoneme symbols, and, in the sense of the selected terminology, a text-containing list entry that has been converted into phonetics, can therefore be used, during voice recognition in the voice-controlled user interface, to connect the word spoken by the user to a text-containing list entry and therefore to carry out the accordingly predefined functions. Phonemes are usually stored in this phonetized data list as a cohesive phonetic word without separate data fields and are provided, in particular, to the voice recognition system or its voice recognizer in the voice-controlled user interface, with the result that the latter can easily access the phonetized data list.

The user is accustomed to being able to very easily change or resort the graphical (textual) representation of databases in general, but in particular also names in telephone books or contact lists, in order to find particular list entries more quickly or to change the database to a form desired by the user. In the case of telephone books or contact lists, the sorting can usually be carried out in this case according to surnames or first names even if the invention is not restricted to this situation.

However, for voice-controlled user interfaces, it is very effective if the phonetized list entries have a certain length since a longer list entry results in a considerably better voice recognition rate. In the case of telephone books or contact lists, it is therefore effective and useful to input the first name and surname in combination. This also already applies irrespective of the better recognition rate because only the mention of a first name or surname can also result in ambiguities in the data list if a surname or first name occurs more frequently. The probability of such duplications is considerably reduced by combining the first name and surname.

This practice of combining first names and surnames, or generally a plurality of data fields of the list entry, in the phonetized data list results, in the event of a change in the representation of the data fields (also called resorting below), for example an alphabetical resorting from surnames to first names or vice versa, in the problem of the phonetics of the names which are required for voice recognition having to be newly created in the voice-controlled user interface. This can be carried out, for example, in a voice recognition system or the voice recognizer present in the voice-controlled user interface.

In the previous systems, the phonetics or the voice-controlled data list was/were newly created by newly phonetizing the reorganized data records. However, since phonetization is very computation-intensive and therefore resource-intensive, a noticeable latency or waiting time until the voice-controlled user interface can be used to recognize names from the data list, or more generally list entries, results for the user when newly phonetizing a larger data list. This is disadvantageous, in particular, because a user is accustomed to graphically newly sorting the name entries, under certain circumstances, immediately before use in mobile data devices having a database function, for example mobile telephones with a contact database, in order to have easier access to a particular list entry. If this is carried out before the user wishes to conduct a conversation using the car telephone and/or a hands-free device, the latency for newly phonetizing the list entries is very disruptive.

SUMMARY OF THE INVENTION

Therefore, an object of the present invention is to propose a possible way of speeding up the creation of a phonetized data list after the representation of list entries having a plurality of data fields has been changed according to a data field.

This object is achieved, according to the invention, with a method, a voice-controlled user interface and a computer readable medium.

In this case, the method mentioned at the outset provides, in particular, for a separating character to be inserted into the text of a list entry, in particular each list entry, between the respective data fields of the list entry, to be concomitantly converted into phonetics and to be concomitantly stored there as a phonetic symbol in the phoneme forming the list entry. The phonemes corresponding to a list entry are concomitantly stored in a phonetic database, in particular in the voice-controlled user interface, the phonetized data list being produced from the phoneme stored in the phonetic database. In contrast, when producing the phonetized data list, the phoneme symbol symbolizing the separating character in the text of the list entry is not taken into account, that is to say is not integrated in the phonemes of a list entry in the phonetized data list. This avoids the phoneme symbol symbolizing the separating character having to be concomitantly spoken.

The practice of storing the phonemes in a separate database with separating characters between the respective data fields of the text-containing list entry makes it possible to create a phonetized data list from this phonetic database without having to carry out new, resource-intensive phonetization in the event of the data list being resorted according to one of the at least two data fields. In contrast, it is sufficient only to newly compile the phonemes stored in the phonetic database in the phonetized data list. This has the advantage that a change in the representation, that is to say the reorganization of the sequences of data fields, for example differently sorted text fields (first name and surname), of the data list having the text-containing list entries enables rapid response times in the voice-controlled user interface. The phonetized data list can therefore be achieved in approximately the same time which is possible for resorting the text-containing list entries in the graphical representation of the user interface. This is substantially achieved by virtue of the fact that a separating character is concomitantly converted into phonetics and can be searched for as a special phoneme symbol in the phoneme corresponding to the list entry, can be identified and can be used to reconstruct the phonemes of the phonetized data list.

Therefore, one preferred embodiment of the proposed method provides for the text-containing list entries in the data list to be able to be resorted according to the data fields, for example alphabetically or according to other sorting criteria, in which case, after resorting (that is to say a change in the representation in the linguistic use of the application) of the list entries, the phoneme symbol corresponding to the separating character between the data fields is identified in phonemes associated with the or each list entry, and in which case the parts of the phonemes before and after the identified phoneme symbol are interchanged, with the result that the phonemes which have been reorganized are stored in a new phonetized data list.

This data list again contains the entire list entry without phonetically disruptive separating symbols and can be produced in the voice-controlled station with low latency without new phonetization having to be carried out, for example, in the voice recognizer of the voice-controlled user interface. The database therefore allows the production of a phonetized data list which corresponds to the representational change of the text fields after resorting. This list replaces the list stored in the voice recognizer. The phonetized data list is therefore created by accordingly reorganizing the phonemes stored in the phonetic database with the phoneme symbol symbolizing the separating character using the separating character(s) and storing them in the data list. The concomitantly stored separating characters allow access in this case to the phonemes or partial phoneme sequences the individual data fields of the textual representation. The separating characters are naturally not concomitantly set in the new phonetized data list since the separating characters are not spoken. The new phonetized data list is then stored and thus replaces the previously stored phonetized data list. The voice-controlled user interface, in particular its voice recognizer, can then access the phonetized name or data list in order to recognize the spoken voice commands. This avoids the computation-intensive grapheme-to-phoneme conversion after a mere change in the representation (resorting) of the list entries according to the different data fields provided.

In a continuation of the concept described above, provision may additionally be made, in particular for the purpose of reorganizing the phonemes after resorting of the text-containing list entries according to the data fields, for the storage position of the phoneme symbol corresponding to the separating character converted into phonetics, for example a character "\t", to be determined in the phonemes corresponding to a, or each, list entry and for the storage contents of the phonemes before and after the determined storage position to be interchanged. The storage position can be easily reached by pointers in the storage area of the microprocessor implementing the method, with the result that only simple computation tasks need to be carried out by the processor overall.

In order to further speed up the reorganization of the phonemes and the production of a new phonetized data list, the invention may provide for the storage position of the phoneme symbol which corresponds to the separating character converted into phonetics to be stored in the phonetic database for the or, in particular, all phonemes corresponding to a list entry. This can preferably be carried out both after determination for the first time and in the event of reorganization of the phoneme. This makes it possible to speed up repeated resorting even further.

One separating character is sufficient in the case of two sortable data fields, for example a first name and a surname. This may be the case in a use that is preferred according to the invention in name or contact lists that have data fields that can be sorted only according to a first name or surname and, for the rest, contain only information associated with these two sortable data fields, for example contact data or addresses.

However, since the invention is not restricted to this case, provision may more generally be made, in particular if there are a plurality of sortable data fields, for a separate, that is to say respectively different, separating character to be assigned, in particular, to each sortable data field of a list entry, which separating character is concomitantly converted into phonetics and is concomitantly stored there as a separate, that is to say respectively different, phoneme symbol in the phonemes. These phonemes are stored in the phonetic database with the phoneme symbol corresponding to the separating character, in which case—as described above—the storage position for each phoneme symbol corresponding to a separating character can optionally also be concomitantly stored in the database in order to quickly reorganize the phoneme even in the case of a plurality of sortable data fields. This preferably applies to each list entry.

The invention may propose that the phonetization is carried out if a device containing a data list having text-containing list entries, in particular a mobile telephone or another data device containing a database, is connected to a voice-controlled user interface, in particular a car telephone and/or a hands-free device of a motor vehicle, for example via a wireless communication interface such as Bluetooth, in particular for the first time or after the text-containing data list has been changed or resorted.

The voice-controlled user interface then preferably has a voice recognition system or voice recognizer with access to the phonetic database, the user interface being set up to detect resorting of the list entries in the data list, and the phonetized data list being reorganized as described above after resorting has been detected.

The invention also relates to a voice-controlled user interface, in particular of a car telephone and/or a hands-free device in a motor vehicle, having a voice recognition system implemented in a voice recognizer, for example, a data interface for connecting a data list having text-containing list entries, and a computing unit, in particular a processor or microprocessor, for controlling the user interface and, in particular, for controlling the voice recognition system and the data interface. According to the invention, the computing unit is set up to carry out the method described above or parts thereof. According to the invention, the voice-controlled user interface has a phonetic database, which can be concomitantly implemented in the computing unit of the user interface.

Finally, the invention relates to a non-transitory computer readable medium storing a computer program suited to setting up a computing unit of a voice-controlled user interface, in particular, for carrying out a method described above or parts thereof. The program code is designed such that, when installed on the computing unit, it sets up the latter to carry out the method according to the invention.

BRIEF DESCRIPTION OF THE DRAWINGS

Further advantages, features and possible uses of the present invention emerge from the following description of an exemplary embodiment and the drawings. In this case, all described and/or depicted features per se or in any desired combination form the subject matter of the present invention, even irrespective of their combination in the claims or their dependency references.

In the drawings:

FIG. 3 shows an exemplary entry in the phonetic database.

DETAILED DESCRIPTION OF THE PRESENTLY PREFERRED EMBODIMENTS

Figure 1:
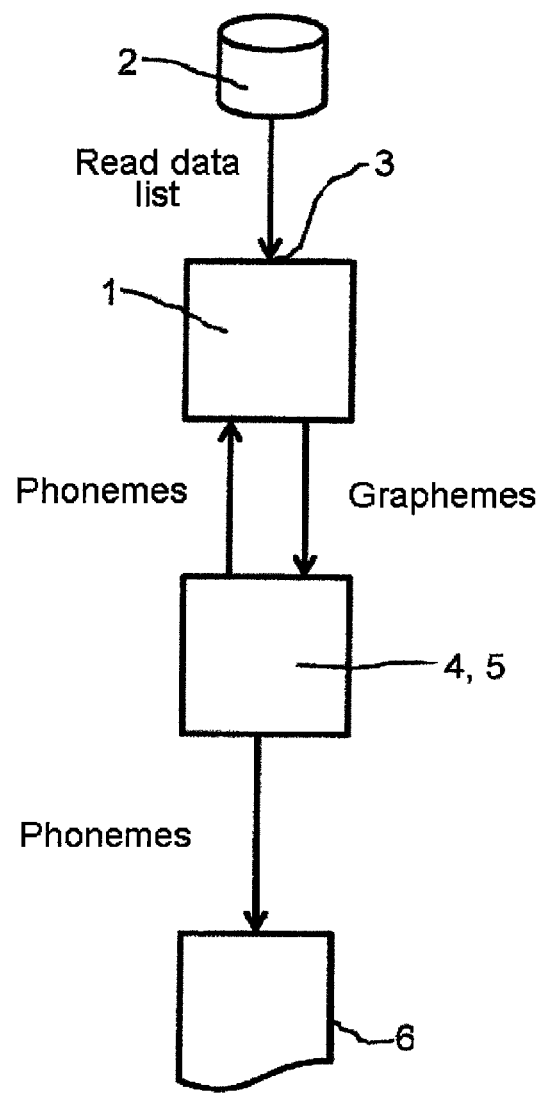
FIG. 1 schematically shows the method sequence for phonetizing a data list in a voice-controlled user interface.

FIG. 1 describes the basic process for phonetizing a data list having text-containing list entries by a voice-controlled user interface 1 which may be, in particular, a multimedia control unit of a motor vehicle, in particular having a telephone and/or hands-free function.

It is conventional for other devices, for example a mobile telephone or another storage device, to transmit a text-containing data list 2 to such a voice-controlled user interface 1. This may be the case, for example, when the device having the text-containing data list 2 is coupled to the voice-controlled user interface via a data interface 3 in a wireless manner, for example via Bluetooth or WLAN, or in a wired manner. After the text-containing data list 2 has been connected to the voice-controlled user interface 1 via the data interface 3, the user interface reads the data list 2, a list entry in the data list being subdivided into at least two data fields.

This subdivision can be carried out during reading by suitable software or may have already been stored in the data list, for example by integrated separating characters between the individual data fields of the list entries. In one preferred, special application, this may be, in particular, a name or contact list in which the first name and surname each constitute a data field, the list being able to be sorted both according to the first data field and according to the second data field. Further data fields then contain the desired contact addresses, for example a telephone number or email, or other information.

After being read in the voice-controlled user interface 1, the text-containing data list 2 is available in a text representation in the form of graphemes, that is to say a sequence of individual grapheme symbols. The grapheme symbols may be, in particular, at least letters standardized within the application or, more generally, text characters having a unique text content.

In order to be able to carry out voice control, the voice-controlled user interface 1 must produce phonetics from this text representation in order to be able to compare the phonetics with voice inputs by the user and carry out the corresponding actions. In this case, the individual data fields of the text-containing list entries are combined in order to increase the voice recognition rate.

The individual list entries are then converted into phonetics in a computing unit 4 of the voice-controlled user interface 1 according to conventional voice-related rules and are stored as a phoneme in a phonetized data list. For this purpose, a voice recognizer 5 or voice recognition system is integrated in the computing unit 4 of the voice-controlled user interface 1. This is already known and therefore need not be described in any more detail, in which case reference is additionally made to the specific exemplary embodiment described below in connection with FIG. 3.

As soon as the phonetization has taken place in the computing unit 4, in particular the voice recognizer 5 integrated therein, of the voice-controlled user interface 1, the voice-controlled user interface 1 can now receive voice commands if the voice commands are given in the form in which the data list 2 was phonetized, that is to say, in particular, also in the selected sorting of the individual data fields. On the whole, this process is implemented in conventional devices.

In the prior art, the operation described above is repeated as soon as the text-containing data list 2 is sorted, for example according to a different data field, with the result that the individual list entries to be phonetized change. This is the case, for example, when, in a name or contact list, resorting between the surname and first name takes place, with the result that the list entries are present once in the form "surname, first name" and another time in the form "first name, surname", which accordingly results in other phonemes of the list entry.

Figure 2:
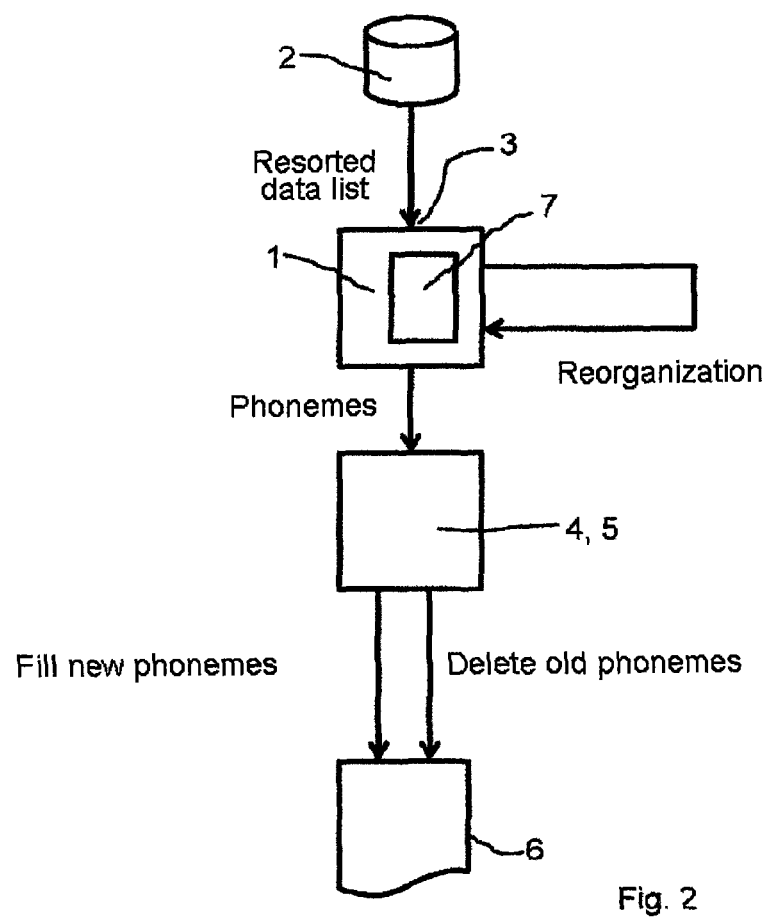
FIG. 2 shows an embodiment of the method proposed according to the invention after the text-containing data list has been resorted.

However, this is very computation-intensive. Therefore, the invention proposes, as illustrated in FIG. 1, that each list entry is also stored as phonemes in the voice-controlled user interface in a phonetic database 7, which is illustrated in FIG. 2 and can naturally also be provided in the computing unit 4 or a storage unit (not illustrated) assigned to the computing unit 4.

These phonemes that correspond to a list entry and are stored in the phonetic database 7 also contain in this case the separating character converted into a phoneme symbol from the text-containing list entries, the position of the phoneme symbol in the phonemes of the phonetized list entry preferably being determined and being concomitantly stored in the phonetic database 7.

This has the advantage that, when a data list 2, which has the same content but has been resorted, is input to the voice-controlled user interface 1, the phoneme symbol corresponding to the separating character is respectively identified in the phonetic database 7 by the voice-controlled user interface 1 and each list entry is reorganized by interchanging the phonemes before and after the phoneme symbol.

These newly produced phonemes (that is to say the phoneme sequence formed from the individual phonemes) are put into the phonetized data list 6 by the computing unit 4 or the voice recognizer 5, in which case the old phonemes are deleted or the old phonetized data list 6 is deleted.

As a result, reorganization is possible in a particularly simple manner according to the invention without a new phonetization being intended to be carried out.

Another specific exemplary embodiment is described below, in which the method according to the invention is used in a vehicle entertainment device having a voice-controlled user interface 1. The vehicle entertainment device contains a data interface 3 for Bluetooth devices. A central function of the vehicle entertainment device is to set up a telephone connection via a mobile telephone connected in this manner. The telephone number can be dialed using a haptic or voice input of the telephone number and by choosing the contact name from the telephone book of the mobile device. Furthermore, office functions, such as a message list or calendar functions, are supported.

When inputting the telephone book names, it is intended to be possible in the exemplary embodiment to input the names in the form in which they are displayed on the screen. For this purpose, two representations are supported: either the first name is input followed by the surname or the input is carried out the other way round, that is to say the surname is input followed by the first name.

The changeover of the representations between first names and surnames as a first input is supported by the graphical user interface within less than 100 ms.

The voice-controlled user interface 1 should achieve this in the most comparable time possible. In order to achieve this, both input variants could be stored as a phonetized name list in the voice recognizer when synchronizing the telephone book entries. However, this would double the amount of data and therefore the memory usage and would double the latency (waiting or processing time) when creating the name lists. The deterioration in the initial latency can be circumvented if a new phonetized data list is first of all produced when changing over the representation of the list. However, the phonetization of the list must then be completely newly created in the known methods. This means a delay in the ability to speak the list, which delay goes beyond the changeover of the graphical representation by a multiple.

In order to circumvent the restrictions described above, use was made of the method according to the invention which, in a specific exemplary embodiment, has the following method steps:

1. After the vehicle entertainment device having the voice-controlled user interface 1 has been connected to the mobile device having the text-containing data list via the Bluetooth data interface 3, an internal database of the vehicle entertainment device is filled with the (text-containing) telephone book entries of the mobile device.
2. The data are read from the internal database by the voice-controlled user interface 1. In this case, a distinction is made between first name and surname, in which case further middle names can also be stored under the first name.
3. The data are read in packets and a separating character ('\t') is inserted between the first name and surname.
4. In order to improve the recognition rate, the data are preprocessed, as described in a parallel patent application (PCT/EP2013/052650) by the same inventor. The preprocessing is used, in particular, to modify the text representation (also referred to as graphemes) of the list entries in a language-defined and/or user-defined manner. This can be carried out using a parser, for example. The separating character ('\t') is obtained in this case.
5. Before each individual data record is inserted into the phonetized list, the separating character is then removed.
6. The phonemes are stored in a further phonetic database 7 different from the internal database for buffering, the position of the separating character for each of the phonemes being concomitantly stored.
7. When changing over the representation of the telephone book list, the current phonetized name list (data list) is now deleted and a new phonetized name or data list 7 is created using the entries in the phonetic database. An example of the content of the phonetic database 7 is illustrated in FIG. 3 for a list entry with the first name and surname of the inventor. This figure shows English phonemes in LH+ coding.
8. The new phonetized name or data list 7 is filled with the data from the phonetic database 7, the data being inserted into the list in the reverse order, based on the order stored during synchronization (steps 1-7).

Since the data are inserted into the phonetized list without a phonetization process, the phonetized name or data list 7 can also be operated by voice a very short time after the graphical representation without an increased storage requirement being significantly produced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method on a voice-controlled user interface (1) having a voice recognizer (5), a data interface (3), and a computing unit (4) configured to control the voice recognizer (5) and the data interface (3), the method comprising:

the data interface (3) receiving a data list (2) having text-containing list entries by transmission from a storage device, each list entry in the received data list (2) having been subdivided into at least two sortable data fields;

the computing unit al converting a received list entry from a text representation into phonetics;

the computing unit (4) storing the phonetics as phonemes in a phonetized data list (6);

the computing unit (4) inserting a separating character into the text of a list entry between the respective sortable data fields of the list entry, concomitantly converting the inserted separating character into phonetics and concomitantly storing the converted separating character as a phoneme symbol;

the computing unit (4) assigning a respectively different separating character to each sortable data field of a list entry, concomitantly converting the assigned separating character into phonetics, and concomitantly storing in a phonetic database (7) the converted assigned separating character as a respectively different phoneme symbol along with the position of the phoneme symbol;

the computing unit (4) storing the phonemes in the phonetic database (7), the phonetized data list (6) being produced from the phonemes stored in the phonetic database (7);

resorting the list entries with respect to a selected one of the at least two sortable data fields based on identifying a separating character, where the resorting results in reorganizing the phonemes stored in the phonetic database (7) with the phoneme symbol symbolizing the separating character associated with the selected one of the at least two sortable data fields and storing them as a new phonetized data list replacing the phonetized data list;

receiving at the voice recognizer (5) a voice command from a user, wherein the voice command comprises a name of a person;

recognizing the voice command based on the new phonetized data list; and controlling the user interface based on the recognized voice command by dialing a telephone number associated with the name of the person.

2. The method as claimed in claim 1, wherein the storage position of the phoneme symbol corresponding to the separating character converted into phonetics is determined in the phonemes corresponding to a list entry and the storage contents before and after the determined storage position are interchanged.

3. A voice-controlled user interface having a voice recognition system (5), a data interface (3) for connecting a data list (2) having text-containing list entries, and a computing unit configured to control the voice-controlled user interface (1), wherein the voice-controlled user interface is configured to carry out the method as claimed in claim 1.

4. A non-transitory computer readable medium storing program code that, when executed, controls a voice-controlled user interface (1) to carry out the method as claimed in claim 1.

* * * * *